J. EEN.
POISON DISTRIBUTER.
APPLICATION FILED JULY 28, 1919.
1,339,556. Patented May 11, 1920.
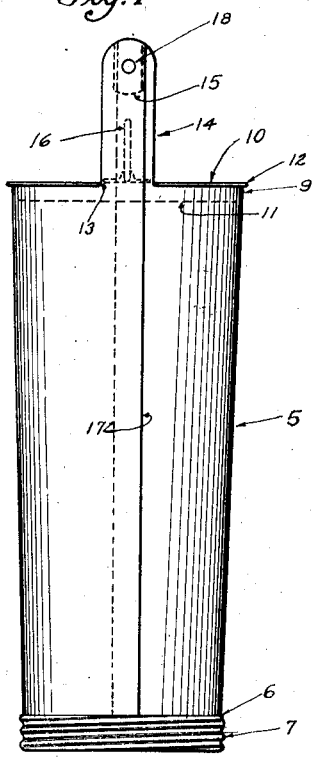
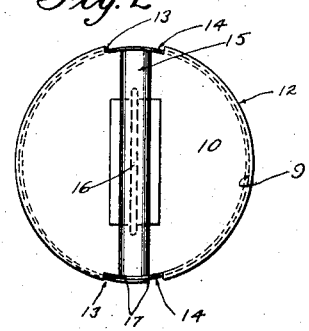 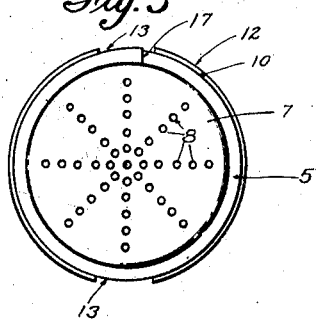
WITNESS:
Ira M. Jones
INVENTOR.
John Een
BY Morsell & Keeney
ATTORNEYS.

UNITED STATES PATENT OFFICE.

JOHN EEN, OF AMHERST, WISCONSIN.

POISON-DISTRIBUTER.

1,339,556.                     Specification of Letters Patent.     Patented May 11, 1920.

Application filed July 28, 1919. Serial No. 313,855.

*To all whom it may concern:*

Be it known that I, JOHN EEN, a citizen of the United States, and resident of Amherst, in the county of Portage and State of Wisconsin, have invented new and useful Improvements in Poison-Distributers, of which the following is a description, reference being had to the accompanying drawings, which are a part of this specification.

The present invention relates to certain new and useful improvements in poison distributers and more particularly to one especially adapted for use in distributing poisons such as Paris green or the like on plants to prevent the destruction of the same by insects.

One object of my invention is to provide a poison distributer in which the container proper is made from a single sheet of material having its edges overlapped to provide a cylindrical container having its ends closed by readily removable caps or covers.

Another object of this invention is to provide a distributer of the class described having one end exteriorly threaded to receive perforated discharge caps of different sizes to adapt the distributer for use with various poisons.

A further object of this invention is to provide a distributer of the class described having a filling opening closed by a readily removable cap having a handle secured to its top surface, and an operating handle disposed above the filling cover handle for convenience in removing the filling cover.

A still further object of this invention is to provide a container for a poison distributer in which the side walls thereof are inclined downwardly and inwardly whereby in shaking the receptacle up and down to discharge the poison, the material therein will be prevented from packing and friction eliminated.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a side elevational view of the container embodying my invention.

Fig. 2 is a top plan view thereof, and

Fig. 3 is a bottom plan view thereof.

Referring now more particularly to the accompanying drawing, in which like numerals designate like parts throughout the several views thereof:

The device comprises a container or receptacle 5 of tapered cylindrical form and provided at its lower smaller end 6 with screw threads for removably receiving a cap or cover 7 having formed therein a plurality of perforations or discharge openings 8. The upper larger end 9 of the container is closed by a cap or cover 10, provided with a depending annular flange 11, adapted to have a snug fit with the top of the container, as best shown in Fig. 1.

The cover 10 is also provided with a lateral peripheral flange or shoulder portion 12 for engaging the top edge of the container 5 and formed therein on opposite sides are recesses 13 for receiving the upstanding projections or lugs 14 formed on the container 5 for receiving an operating handle 15. The cover 10 has formed on its top, a handle 16 which is in line with the opposed recesses 13 and substantially parallel with the operating handle 15, for convenience in removing the cover 10.

The flange 12 of cover 10 has a snug or tight fit with the upper end of the container 5 to prevent the accidental dislodgment of the same by the material in the container striking thereagainst when the distributer is in use. The handle 15 serves as a means for handling the distributer and as a brace to permit a firm purchase in gripping the handle 16 to remove the cover 10 as will be obvious.

The container 5 is formed from a single sheet of material so cut that when its side edges 17 are overlapped, the overlapped portion will form a part of one of the upstanding lugs 14. The transverse pin or rivet 18 of the handle 15 will thus assist in securing the edges 17 in overlapped position, and the cover 7 will serve to retain the lower portion of the edges 17 in overlapped position. If desired, the edges 17 may be further secured in overlapped position by suitable rivets, soldering, spot welding or the like.

The forming of the container 5 with downwardly and inwardly inclined walls greatly increases the efficiency of the distributer in that the poisons or material therein will be prevented from packing when the container is rapidly moved up and down to discharge the material therein, and this structure also eliminates friction as will be readily apparent to those skilled in the art to which a device of this character appertains.

What I claim as my invention is:

1. A distributer of the class described comprising a tapered open ended container having screw threads formed on its smaller end, a perforated cap in threaded engagement with the threaded end of the container, a cap closing the larger end of the container, and an operating handle connected with the container at its larger end.

2. A distributer of the class described comprising an open ended container having downwardly and inwardly inclined walls, a perforated cap having a threaded engagement with the small end of the container, a second cap having a depending annular flange in snug engagement with the wall of the container adjacent the large end to close the same, spaced apart ears formed on the large end of the container, an operating handle secured to said ears, and a handle carried by said second cap and disposed beneath the operating handle.

3. A distributer comprising an open ended container formed from a single sheet of material in the condition of having been folded with its ends overlapped, a pair of spaced apart ears at one end of the container and formed integral with the sheet of material, one of said ears being formed by said overlapping ends, an operating handle secured to said ears, a perforated cap closing the end of the container remote from the end having the spaced apart ears, and a cap closing the other end of the container.

In testimony whereof I affix my signature.

JOHN EEN.